United States Patent [19]

Valde

[11] Patent Number: 5,069,539

[45] Date of Patent: Dec. 3, 1991

[54] AIRTIGHT JOINING ELEMENT BETWEEN AN EXTERNAL CONTAINER AND A SUPPORTING ELEMENT FOR AN EXTERNAL REARVIEW MIRROR ASSEMBLY FOR A VEHICLE

[75] Inventor: Giuseppe Valde, Turin, Italy

[73] Assignee: Gulardini S.p.A., Turin, Italy

[21] Appl. No.: 496,428

[22] Filed: Mar. 20, 1990

[30] Foreign Application Priority Data

Mar. 20, 1989 [IT] Italy .............................. 52952/89[U]

[51] Int. Cl.⁵ .............................................. G02B 7/18
[52] U.S. Cl. ..................................... 359/514; 359/871
[58] Field of Search ................ 350/582, 589, 590, 631

[56] References Cited

U.S. PATENT DOCUMENTS

| | | | |
|---|---|---|---|
| 3,171,886 | 3/1965 | Holt et al. | 350/590 |
| 3,445,151 | 5/1969 | Stefanakis | 350/590 |
| 3,656,830 | 4/1972 | Kurschner | 350/590 |

*Primary Examiner*—Bruce Y. Arnold
*Assistant Examiner*—J. P. Ryan
*Attorney, Agent, or Firm*—Gifford, Groh, Sprinkle, Patmore and Anderson

[57] ABSTRACT

A beaker-shaped, airtight joining element between an external container and a supporting element with a non-circular cross-section, of an external rearview mirror assembly for a vehicle, comprising a first airtight compartment around said supporting element, and a second cylindrical part housed in the container and having a circular cross-section coaxial to the rotational axis of container with respect to supporting element.

14 Claims, 3 Drawing Sheets

AIRTIGHT JOINING ELEMENT BETWEEN AN EXTERNAL CONTAINER AND A SUPPORTING ELEMENT FOR AN EXTERNAL REARVIEW MIRROR ASSEMBLY FOR A VEHICLE

BACKGROUND OF THE INVENTION

The present invention relates to an external rearview mirror assembly and in particular, but not exclusively, to an external rearview mirror assembly for an industrial vehicle.

Known external rearview mirror assemblies for industrial vehicles normally comprise a substantially C-shaped supporting element which is adapted to be hinged at its ends to a wing of the vehicle body, and a mirror housed in an external container connected to a central part of the supporting element; said supporting element is usually formed by a metal tube which thus has a circular cross-section, in which are passed the wires providing electrical power to the mirror position adjusting devices and, if present, to the defrosting devices.

At least one of the points at which the supporting element is connected to the vehicle body consists of a hinge adapted to define at least one preferential stable position for the supporting element in relation to the vehicle body and, in addition, the joint between the external container and the supporting element is also made adjustable by passing the metal tube in slots defined by cross ties fixed to the external container and held by screws against said tube, in a rear slot on the container, which must be accessible to the user for assembling and adjusting purposes, and that is therefore usually closed by a lid; said supporting element thus passes into the container of the mirror at sections that must be sealed against external infiltration, and annular gaskets are usually applied at said sections of the supporting element.

The conventional assembly described above has drawbacks when the supporting element does not have a circular cross-section, in that the container does not rotate coaxially to the larger section of the supporting element, thus deforming the gaskets, and this not only obstructs rotation but also reduces the sealing capacity of said gaskets.

SUMMARY OF THE INVENTION

The object of the present invention is to provide an airtight joining element between a container and a supporting element for an external rearview mirror assembly for an industrial vehicle, which overcomes the drawback mentioned above, in a simple and economical fashion.

Other aims and advantages achieved by the present invention will become clear from the description that follows.

According to the present invention, there is provided an airtight joining element between an external container and a supporting element for an external rearview mirror assembly for a vehicle, said supporting element moving into said container with a section which does not have a circular cross-section, characterized in that it comprises a first airtight compartment around said supporting element, and a second part housed in said container and with a circular cross-section, coaxial to the rotational axis of said container with respect to said supporting element.

BRIEF DESCRIPTION OF THE DRAWINGS

The present invention will be explained by way of a preferred embodiment, to be taken as a non-limiting example, with reference to the accompanying drawings, in which.

DETAILED DESCRIPTION OF THE INVENTION

Figure 1:
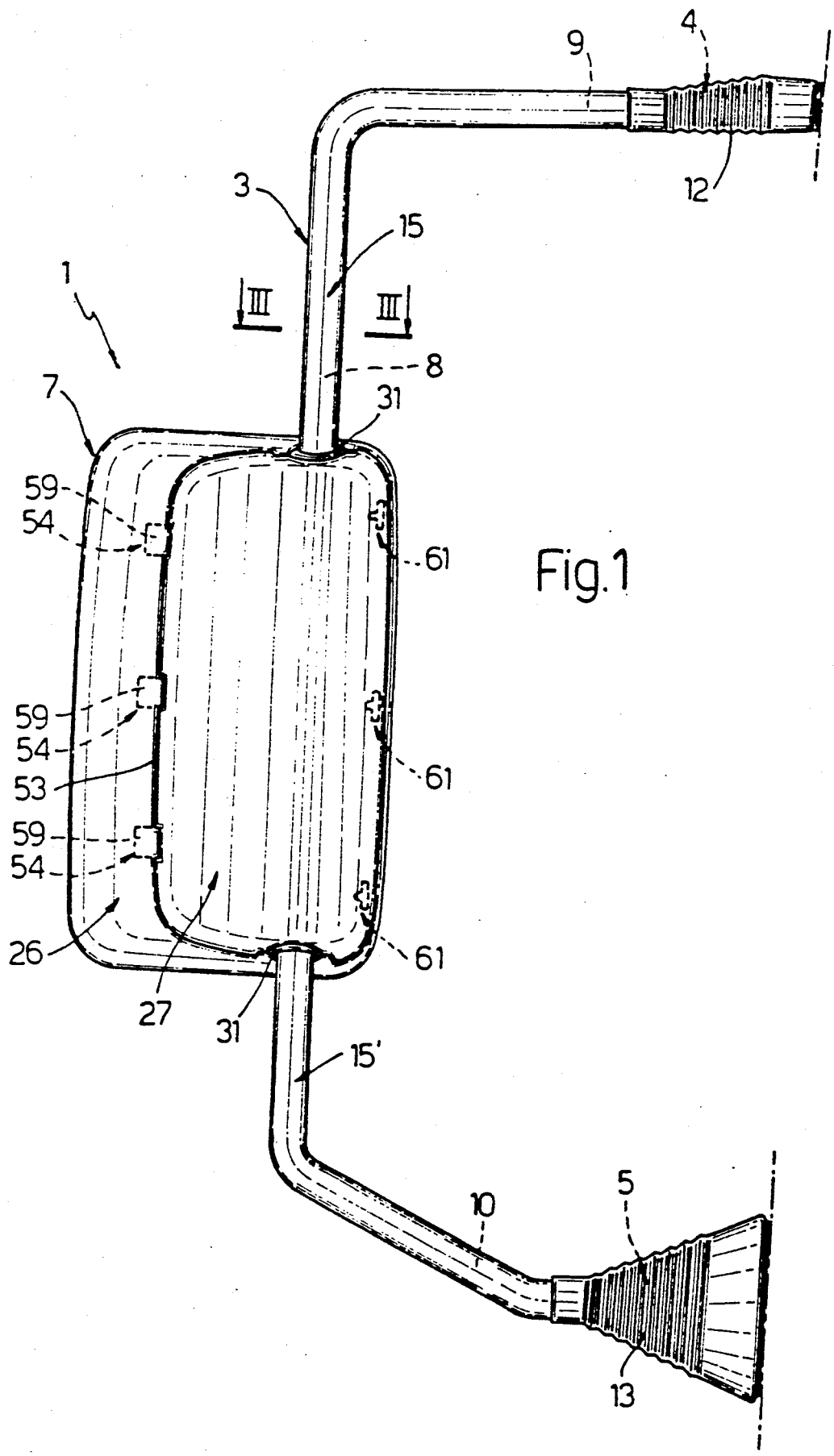
FIG. 1 is the view from the rear of an external rearview mirror assembly for an industrial vehicle, equipped with an airtight joining element between an external container and a supporting element, in accordance with the present invention.

In reference to FIG. 1, numeral 1 shows, in its entirety, an external rearview mirror assembly adapted for application onto an industrial vehicle, in a known and not illustrated fashion. Said assembly 1 comprises, in a known fashion, a supporting element 3 hinged to project from the body of a vehicle by two hinging assemblies, one upper and one lower, indicated by 4 and 5 respectively, and a mirror 6 (FIG. 2) housed at one end in an external container 7 which is joined to said supporting element 3, which is made of a metal tube bent into a substantially C shape and comprises a vertical central part 8, to which container 7 is joined in an adjustable manner, and a pair of approximately horizontal arms 9 and 10, one upper and one lower, which present at their free ends, respectively, hinge assemblies 4 and 5, which are covered, respectively, by bellows 12 and 13.

Figure 3:
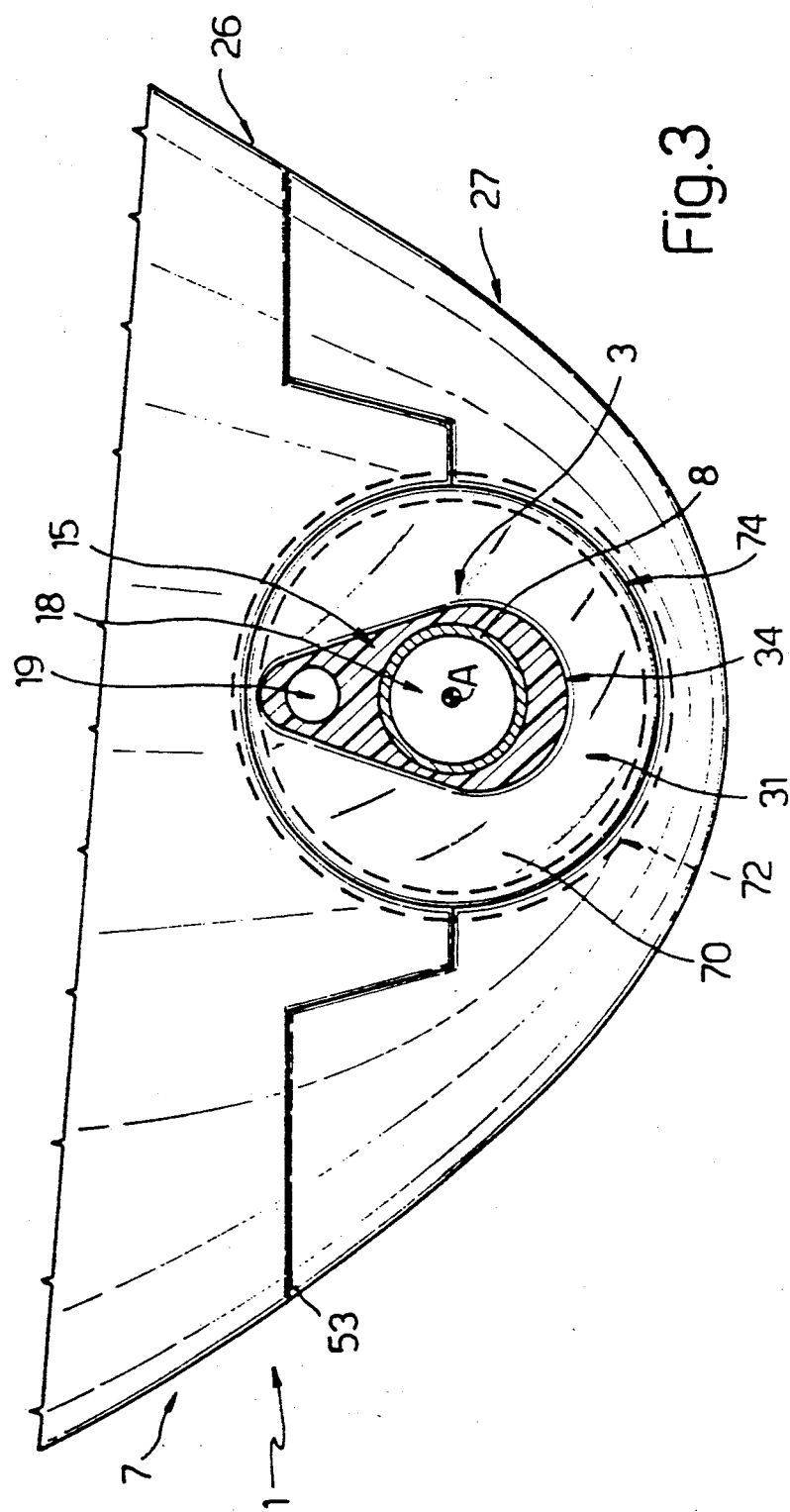
FIG. 3 is a sectional view along a line III—III of the rearview mirror assembly shown in FIG. 1.

On supporting element 3 are set, on the sections above and below container 7, respectively, two sheaths 15 and 15', which present a cross-section of a different type with respect to the circular cross-section of supporting element 3, in the area in which they are covered, and are most suitably of the type described in the Italian utility model patent application, filed on the same day by the same applicant, entitled "Covering sheath of a supporting element of an external rearview mirror assembly for a vehicle", the contents of which, regarding the necessary parts, are incorporated here, for reference purposes; in particular, said sheaths 15 and 15', which are most suitably made of a plastic material, have a pear-shaped cross-section (FIG. 3), and a first cylindrical longitudinal cavity 18, in the areas of greater cross-section of said sheaths 15 and 15', which houses supporting element 3, and a second cylindrical longitudinal cavity 19, with a smaller diameter, in which may be passed an electrical wire for supplying devices, of a known and not illustrated type, which adjust the position and/or temperature of mirror 6.

Figure 2:
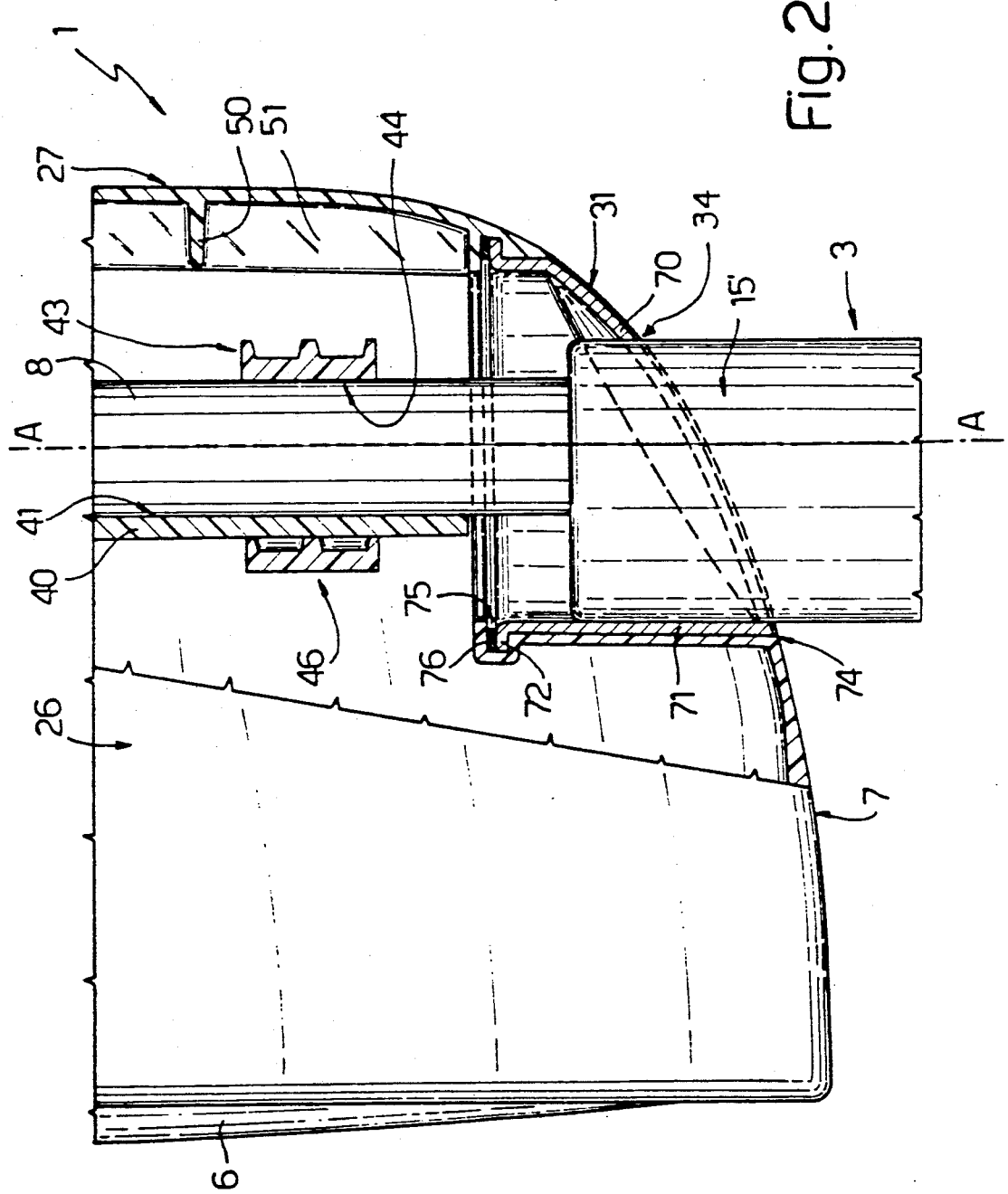
FIG. 2 is a side, and partially sectional, view of a lower part of the rearview mirror assembly shown in FIG. 1.

FIG. 2 shows a section of vertical central part 8 of tube-shaped supporting element 3, which moves into external container 7, which has a main part 26, closed at the rear by a lid 27, most suitably of the type described in the Italian utility model patent application, filed on the same day by the same applicant, entitled "Closing lid for a rear slot on a container of an external rearview mirror assembly for a vehicle", the contents of which, regarding the necessary parts, are incorporated here, for reference purposes; in particular, said main part 26 has a rear wall 40, opposite the opening for housing mirror 6, which forms on the outside a semicylindrical vertical cavity 41 that partially houses a corresponding section of vertical central part 8 of supporting element 3, which is held against said rear wall 40 by a pair of cross ties 43, spaced out along said central tubular part 8, and fixed by a respective pair of screws on the outside of cross ties 43, passing through rear wall 40, and screwed into corresponding cross ties 46 set on and fixed to the surface of wall 40 in the slot inside container 7. External cross ties 43 also have a corresponding semicircular cavity 44 so as to fit closely onto the surface of central tubular part 8 outside vertical cavity 41. Lid 27 has a concave form, is most suitably made of a plastic material, which must be relatively thin so as to be relatively pliable, and has a substantially rectangular outline, corresponding to that of rear wall 40 of main part 26 of container 7 (FIGS. 1 and 3), so as to form, with said main part 26, a substantially uninterrupted external surface of container 7. From the inner surface of said lid 27, towards main part 26, extend a plurality of relatively perpendicular and evenly spaced strengthening walls, horizontal 50 and vertical 51, respectively, and said lid has a vertical end edge 53, three evenly spaced parts 54 (FIG. 1), which have a respective appendage 59 that passes through a slot into the cavity of main part 26, and which define a lid joining hinge 27 on part 26. Towards the other vertical end edge of lid 27, opposite said edge 53, from the inner surface of lid 27 protrude three engaging appendages, substantially coinciding with the evenly spaced parts 54, which are adapted to fit into respective, relatively wider slots, machined into wall 40 of part 26, towards the corresponding vertical end edge.

Sheath 15' which covers both vertical part 8 of supporting element 3 below container 7 and lower arm 10, ends at the top in a beaker 31, in accordance with the present invention, which is most suitably made of a plastic material and has a base 70, a side wall 71 and an upper annular edge protruding outwards; side wall 71 has an internal diameter substantially equal to the maximum distance between the external surface of sheath 15' and axis A of cavity 18, which corresponds to the distance between said axis A and the recurved top surface opposite the convex base (FIG. 3), and is housed in a corresponding cylindrical cavity 74 partially machined into main part 26 of container 7 and partially in lid 27. Upper edge 72 is in turn housed in a corresponding annular groove 75 partially machined into wall 40 of main part 26 and partially into rear lid 27, and said groove 75 also houses an annular seal 76.

Base 70 of beaker 31 has an opening 34 of the same shape, but of a slightly smaller size, as sheath 15' which, as it is made of relatively pliable material, fits to it forming a seal; said base 70 also has a curved surface, so as to fit along the contiguous surface of container 7 (FIG. 2) substantially without discontinuity, when the setting between supporting element 3 and container 7 corresponds to a basic preferential position.

Sheath 15 which covers both vertical part 8 of supporting element 3 above container 7 and upper arm 9 ends at the top in a beaker 31, similar to the one described above.

Said beakers 31 are thus sealed to respective sheaths 15 and 15' covering supporting element 3, and are set with their edges 72 in the respective annular grooves 75 of main part 26 of container 7, and so lid 27 may be closed, thus blocking the end of said edges 72.

The advantages of the airtight joining element in accordance with the present invention are evident from the description given above; in particular, using an element that is both simple and economical to make, when container 7 is made to rotate about axis A of supporting element 3, annular grooves 75 rotate coaxially about said axis and with respect to coaxial edges 72 of the two beakers 31, which are fixed to supporting element 3, so the desired rotation of said container with mirror 6 is obtained, without any hindrance to its movement, and without any deformation resulting in damage to the seal inside container 7, the seal continuing to be assured by sheaths 15 and 15' passing in an airtight fashion into openings 34 of respective beakers 31, and the annular gaskets 76 into grooves 75. The curved base 70 of said beakers 31 makes it unnecessary to alter the overall shape of the external surface of container 7, and said base 70 is most suitably slightly lowered so that when container 7 is rotated slightly with respect to supporting element 3, beakers 31 do not protrude from the overall outline of the surface of container 7.

It is clear that, to the embodiment of the airtight joining element described and illustrated, modifications and variants may be made without exceeding the scope of the present invention; for example, the shape of the parts may be altered as required.

I claim:

1. An airtight joining element positioned between an external container and a supporting element for an external rearview mirror assembly for a vehicle, said supporting element inserting into said container a section which does not have a circular cross-section, characterized in that said airtight joining element comprises a first airtight part surrounding said supporting element and a second part housed in said container with a circular cross-section coaxial to the rotatinal axis A of said container with respect to said supporting element 2. The airtight joining element as claimed in claim 1, characterized in that said first and second parts are incorporated into a single piece.

3. The airtight joining element as claimed in claim 2, characterized in that said single piece is made of a plastic material.

4. The airtight joining element as claimed in claim 2, characterized in that said single piece has the shape of a beaker with a base comprising said first part, and a side wall comprising said second part with a radius substantially equal to the maximum distance from the surface of said supporting element to said rotational axis (A) between said container and said supporting element.

5. The airtight joining element as claimed in claim 4, characterized in that said base has an opening which has substantially the same cross-section as said section having the non-circular cross-section of said supporting element.

6. The airtight joining element as claimed in claim 4, characterized in that said base has a curved surface substantially continuous with the surface of said external container in the area in which it is housed in the basic position of said with respect to said supporting element.

7. The airtight joining element as claimed in claim 4, characterized in that said side wall comprises joining means for the support and rotation of said container.

8. The airtight joining element as claimed in claim 7, characterized in that said joining means comprise an annular upper edge of said wall, said annular upper edge being adapted to fit into a corresponding annular groove of said container.

9. The airtight joining element as claimed in claim 8, characterized in that said annular groove also houses an annular seal.

10. The airtight joining element as claimed in claim 1, characterized in that it includes a vertical central part closed between a main part and a lid of said external container.

11. The airtight joining element as claimed in claim 1, characterized in that said supporting element has a first internal part with a circular cross-section, said first internal part being covered by a second part with a non-circular cross-section passing through said first part of said joining element.

12. The airtight joining element as claimed in claim 11, characterized in that said second part covering said supporting element is made of a relatively softer material than that of said first part of said joining element.

13. The airtight joining element as claimed in claim 1, wherein said external container houses at least one mirror for an external rearview mirror assembly of a vehicle.

14. The airtight joining element as claimed in claim 13, characterized in that said supporting element is substantially C-shaped and includes a central part to which is connected in an adjustable manner said external container of said mirror and a pair of respectively upper and lower arms joined by respective hinging means to the body of said vehicle.

* * * * *